US012768318B2

(12) United States Patent
Karlsson

(10) Patent No.: US 12,768,318 B2
(45) Date of Patent: Oct. 20, 2026

(54) POWERTRAIN SYSTEM FOR A VEHICLE

(71) Applicant: VOLVO TRUCK CORPORATION, Gothenburg (SE)

(72) Inventor: Johan Karlsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 3 days.

(21) Appl. No.: 18/973,940

(22) Filed: Dec. 9, 2024

(65) Prior Publication Data

US 2025/0207544 A1 Jun. 26, 2025

(30) Foreign Application Priority Data

Dec. 20, 2023 (EP) .................................... 23218456

(51) Int. Cl.
*F02M 21/02* (2006.01)
*F02D 19/02* (2006.01)

(52) U.S. Cl.
CPC ....... *F02M 21/0221* (2013.01); *F02D 19/022* (2013.01); *F02M 21/0206* (2013.01); *F02M 21/0245* (2013.01)

(58) Field of Classification Search
CPC ........... F02M 21/0245; F02M 21/0221; F02M 21/0206; F02D 19/022
See application file for complete search history.

(56) References Cited

U.S. PATENT DOCUMENTS

2008/0125955 A1 5/2008 Boyer et al.
2021/0301775 A1 9/2021 Puran et al.
(Continued)

FOREIGN PATENT DOCUMENTS

JP 2008038680 A 2/2008
JP 2012117495 A 6/2012
(Continued)

OTHER PUBLICATIONS

Extended European Search Report in corresponding European Application No. 23218456.4 dated May 23, 2024 (7 pages).
(Continued)

*Primary Examiner* — Kevin A Lathers
(74) *Attorney, Agent, or Firm* — Jeffri A. Kaminski; Venable LLP

(57) ABSTRACT

A powertrain system has an engine, a gaseous fuel tank system having a set of gaseous fuel tanks for storing pressurized gaseous fuel. The gaseous fuel tank system is in fluid communication with the engine. A compressor assembly pressurizes gaseous fuel. In a first powertrain operational mode gaseous fuel is supplied from at least one of the gaseous fuel tanks of the set of gaseous fuel tanks to the engine in a non-operational mode of the compressor assembly. In a second powertrain operational mode gaseous fuel from at least one of the gaseous fuel tanks is pressurized by the compressor assembly in an operational mode of the compressor assembly, and supplied to the engine. A controller predict a first potential change in the engine efficiency; the at least one of the pressure levels, and a needed power output from the engine for operating the compressor assembly, a second potential change in the engine efficiency for the second powertrain operational mode; compare the predicted first potential change with the predicted second potential change to control the compressor assembly.

15 Claims, 3 Drawing Sheets

(56) References Cited

U.S. PATENT DOCUMENTS

| | | | |
|---|---|---|---|
| 2024/0125280 A1 | 4/2024 | Catalano | |
| 2025/0154913 A1* | 5/2025 | Munshi | F02D 19/0665 |

FOREIGN PATENT DOCUMENTS

| | | |
|---|---|---|
| WO | 2022266769 A1 | 12/2022 |
| WO | 2023147651 A1 | 8/2023 |
| WO | 2024119267 A1 | 6/2024 |

OTHER PUBLICATIONS

Extended European Search Report dated Mar. 13, 2025 in corresponding European Patent Application No. 24204016.0, 10 pages.

* cited by examiner

POWERTRAIN SYSTEM FOR A VEHICLE

TECHNICAL FIELD

The disclosure relates generally to powertrain systems for vehicles. In particular aspects, the disclosure relates to powertrain systems having an internal combustion engine operable on a gaseous fuel, such as a hydrogen-based fuel. In other aspects, the disclosure relates to a vehicle comprising such powertrain system. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

The utilization of alternative fuels, such as hydrogen gas and natural gas, as clean and sustainable fuel components for internal combustion engines is one of the many examples considered in the heavy-duty vehicle industry.

However, using alternative fuels in a vehicle may present several new challenges to the powertrain system of the vehicle, including the internal combustion engine (ICE) and the fuel supply system, in comparison with more traditional fuels.

One of these challenges relates to the supply of fuel from the fuel tank(s) to the ICE. By way of example, conventional hydrogen fuel storage systems for heavy-duty vehicles may generally include one or more high-pressure fuel tanks. However, the fuel injection processes in the ICE system may occur at substantially lower pressures. In other words, the fuel, such as pressurized hydrogen gas, needs to be delivered to the ICE at a suitable pressure level. There is thus a need for further development to provide efficient delivery of pressurized hydrogen gas to the ICE of a heavy-duty vehicle.

SUMMARY

According to a first aspect of the disclosure, there is provided a powertrain system for a vehicle, the powertrain system comprising an engine operable on a gaseous fuel, a gaseous fuel tank system having a set of gaseous fuel tanks for storing pressurized gaseous fuel, the gaseous fuel tank system being configured to be in fluid communication with the engine, and further a compressor assembly for pressurizing gaseous fuel, the powertrain system being operable in a first powertrain operational mode, in which gaseous fuel is supplied from at least one of the gaseous fuel tanks of the set of gaseous fuel tanks to the engine in a non-operational mode of the compressor assembly, and in a second powertrain operational mode, in which gaseous fuel from at least one of the gaseous fuel tanks is pressurized by the compressor assembly in an operational mode of the compressor assembly, and supplied to the engine, wherein the powertrain system further comprises a controller configured to: predict, based on a current engine efficiency parameter and data indicative of at least one pressure level of at least one gaseous fuel tank of the set of gaseous fuel tanks, a first potential change in the engine efficiency for the first powertrain operational mode; predict, based on the current engine efficiency parameter, data indicative of at least one pressure level of at least one gaseous fuel tank of the set of gaseous fuel tanks, and a needed power output from the engine for operating the compressor assembly to provide a predetermined pressure fuel level, a second potential change in the engine efficiency for the second powertrain operational mode; compare the predicted first potential change in the engine efficiency with the predicted second potential change in the engine efficiency; and control the compressor assembly either in the operational mode or the non-operational mode based on the comparison.

The first aspect of the disclosure may seek to enhance the efficiency of a powertrain system for a vehicle including at least an internal combustion engine operable on a gaseous fuel and a compressor assembly. A technical benefit may include providing an improved usage of the compressor assembly based on the operating conditions of the ICE.

In addition, the proposed disclosure allows for providing a more dynamic and precis regulation of the fuel from the fuel tanks to the ICE, which is based on predicted engine operating conditions.

The proposed powertrain system further allows for better determining the optimal conditions for enhanced efficiency of the ICE and the powertrain system by assessing the impact of operating the compressor assembly to attain requisite gas pressure rather than directly sourcing it from fuel tanks. As such, the compressor assembly can be controlled in an improved manner, including e.g. operating situations where increased efficiency of the powertrain system is foreseeable, where activating the compressor may become a priority. By determining operational parameters of the powertrain system, such as current engine efficiency, pressure levels in one or more gaseous fuel tanks and changes in engine efficiency, and controlling the powertrain system on the basis of these operational parameters, it becomes possible to increase the likelihood of engaging the compressor when associated energy costs are minimized, thereby improving the utilization of the compressor assembly.

In addition, the proposed powertrain system may provide for improving the use of the pressurized fuel during varying operating conditions of the ICE and the vehicle.

The powertrain system may be particularly useful in combination with an engine in the form of a high-pressure direct injection fuel system. Hence, the powertrain system may typically comprise an internal combustion engine in the form of a high-pressure direct injection internal combustion engine. The powertrain system may in addition, or alternatively be used in combination with a spark-ignited internal combustion engine, such as a spark-ignited high pressure direct inject internal combustion engine or a diffusion combustion internal combustion engine.

Optionally in some examples, including in at least one preferred example, if the predicted second potential change in the engine efficiency is higher than the predicted first potential change in the engine efficiency, the controller is configured to control the compressor assembly in the operational mode, such that the compressor assembly can pressurize gaseous fuel to the predetermined pressure fuel level.

Optionally in some examples, including in at least one preferred example, if the predicted first potential change in the engine efficiency is equal to, or higher than, the predicted second potential change in the engine efficiency, the controller is configured to control the compressor assembly in the non-operational mode, allowing gaseous fuel from at least one of the gaseous fuel tanks of the set of gaseous fuel tanks to be supplied to the engine.

Optionally in some examples, including in at least one preferred example, the controller may be configured to receive data indicative of the current engine efficiency parameter.

Optionally in some examples, including in at least one preferred example, the controller may be configured to receive data indicative of current engine torque and current engine speed, and further configured to determine the current engine efficiency parameter based on the current engine torque and current engine speed. A technical benefit may include providing an even more precise determination of the engine efficiency.

Optionally in some examples, including in at least one preferred example, the controller may be configured to receive data indicative of pressure levels in one or more gaseous fuel tanks of the set of gaseous fuel tanks.

Optionally in some examples, including in at least one preferred example, the controller may be further configured to determine pressure levels of each one of the gaseous fuel tanks of the set of gaseous fuel tanks.

Optionally in some examples, including in at least one preferred example, the controller may be further configured to predict, based on the current engine efficiency parameter and data indicative of pressure levels of each one of the gaseous fuel tanks, the first potential change in the engine efficiency for the first powertrain operational mode; predict, based on the current engine efficiency parameter, data indicative of the pressure levels of each one of the gaseous fuel tanks, and a needed power output from the internal combustion engine for operating the compressor assembly to provide the predetermined pressure fuel level, the second potential change in the engine efficiency for the second powertrain operational mode. A technical benefit may include providing an even more improved determination of the available pressure levels of the fuel tanks, in which all fuel tanks are taken into consideration.

Optionally in some examples, including in at least one preferred example, the compressor assembly may be a reciprocating compressor having a compressor cylinder for accommodating a compressor piston. A technical benefit may include facilitating the installation and operation of the compressor assembly in a powertrain system for gaseous fuels, such as hydrogen gas.

Optionally in some examples, including in at least one preferred example, the compressor assembly may be arranged in a gaseous fuel conduit in-between the engine and the gaseous fuel tank system. A technical benefit may include providing an improved arrangement of the compressor assembly in the powertrain system, allowing for an increased efficiency of the compressor assembly for pressurizing the fuel from the fuel tank(s).

Optionally in some examples, including in at least one preferred example, the compressor assembly may be arranged in-between the engine and a first fuel tank of the gaseous fuel tank system.

Optionally in some examples, including in at least one preferred example, the gaseous fuel may be a hydrogen-based fuel or a natural gas fuel. A technical benefit may include utilization of a fuel having a high energy density, which for hydrogen gas (H2) is approximately 120 MJ/kg and for natural gas (NG) is approximately 55 MJ/kg.

Optionally in some examples, including in at least one preferred example, the fuel may be hydrogen gas or natural gas.

Optionally in some examples, including in at least one preferred example, the engine may be a spark-ignited internal combustion engine. In addition, the engine may be a high-pressure direct injected internal combustion engine.

The internal combustion engine may be a hydrogen internal combustion engine, such as a hydrogen high-pressure direct injection internal combustion engine, wherein the fuel tanks(s) may be arranged to supply pressurized hydrogen gas to the internal combustion engine.

Optionally in some examples, including in at least one preferred example, the fuel tanks may be configured to store pressurized gaseous fuel at about 700 to 800 bar. For example, the fuel tanks are arranged to maintain the pressurized gaseous fuel at a maximum pressure of 800 bar. For example, the fuel tanks are arranged to store the pressurized gaseous fuel between 700 bar and 800 bar.

Optionally in some examples, including in at least one preferred example, the fuel stored in the fuel tanks is mainly gaseous fuel. For example, at least 70%, or at least 80%, or at least 90%, or at least 95% (based on volume) of the fuel in the fuel tanks is gaseous. Thus, the fuel tanks are arranged to store the fuel as pressurized gaseous fuel such that at least 70%, or at least 80%, or at least 90%, or at least 95% (based on volume) of the fuel in the fuel tanks is gaseous.

Optionally in some examples, including in at least one preferred example, the compressor assembly may be configured to at least partly be powered by the internal combustion engine.

Optionally in some examples, including in at least one preferred example, the compressor assembly may be configured to at least partly be powered by an auxiliary power source. Typically, the auxiliary power source is a different power source than the engine.

According to a second aspect of the disclosure, there is provided a vehicle comprising a powertrain system according of the first aspect of the disclosure is provided. The second aspect of the disclosure may seek to solve the same problem as described for the first aspect of the disclosure. Thus, effects and features of the second aspect of the disclosure are largely analogous to those described above in connection with the first aspect of the disclosure.

Optionally in some examples, including in at least one preferred example, the vehicle further comprises an engine in the form of a hydrogen combustion engine or a hydrogen high-pressure direct injection engine. The engine is configured to receive the pressurized fuel from the fuel tank(s) for combustion inside the engine. For example, the powertrain system may comprise a fuel rail arrangement disposed upstream of one or more fuel injectors of the engine, wherein the fuel rail arrangement may be arranged to supply pressurized gaseous fuel to the fuel injector(s) of the engine.

According to a third aspect of the disclosure, there is provided a method for controlling a compressor assembly of a powertrain system for a vehicle, the powertrain system comprising an engine operable on a gaseous fuel, a gaseous fuel tank system having a set of gaseous fuel tanks for storing pressurized gaseous fuel, the gaseous fuel tank system being configured to be in fluid communication with the engine, and further the compressor assembly for pressurizing gaseous fuel, the powertrain system being operable in a first powertrain operational mode, in which gaseous fuel is supplied from at least one of the gaseous fuel tanks of the set of gaseous fuel tanks to the engine in a non-operational mode of the compressor assembly, and in a second powertrain operational mode, in which gaseous fuel from at least one of the gaseous fuel tanks is pressurized by the compressor assembly in an operational mode of the compressor assembly and supplied to the engine. Moreover, the method is implemented by a controller having a processing circuitry, wherein the method comprises: predicting, based on a current engine efficiency parameter and data indicative of at least one pressure level of at least one gaseous fuel tank of the set of gaseous fuel tanks, a first potential change in the engine efficiency for the first powertrain operational mode; predicting, based on the current engine efficiency parameter, data indicative of at least one pressure level of at least one gaseous fuel tank of the set of gaseous fuel tanks, and a needed power output from the engine for operating the compressor assembly to provide a predetermined pressure fuel level, a second potential change in the engine efficiency for the second powertrain operational mode; comparing the predicted first potential change in the engine efficiency with the predicted second potential change in the engine efficiency; and controlling the compressor assembly based on the comparison.

The third aspect of the disclosure may seek to solve the same problem as described for the first to second aspects of the disclosure. Thus, effects and features of the third aspect of the disclosure are largely analogous to those described above in connection with the first and second aspects of the disclosure.

Optionally, the method may further comprise receiving data indicative of a current engine efficiency parameter; and receiving data indicative of pressure levels in one or more gaseous fuel tanks of the set of gaseous fuel tanks.

According to a fourth aspect of the disclosure, there is provided a computer program product comprising program code for performing, when executed by the processing circuitry comprised in the computer system of the first aspect, the method of the third aspect.

According to a fifth aspect of the disclosure, there is provided a non-transitory computer-readable storage medium comprising instructions, which when executed by the processing circuitry of the first aspect, cause the processing circuitry to perform the method of the third aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

DETAILED DESCRIPTION

Figure 1:
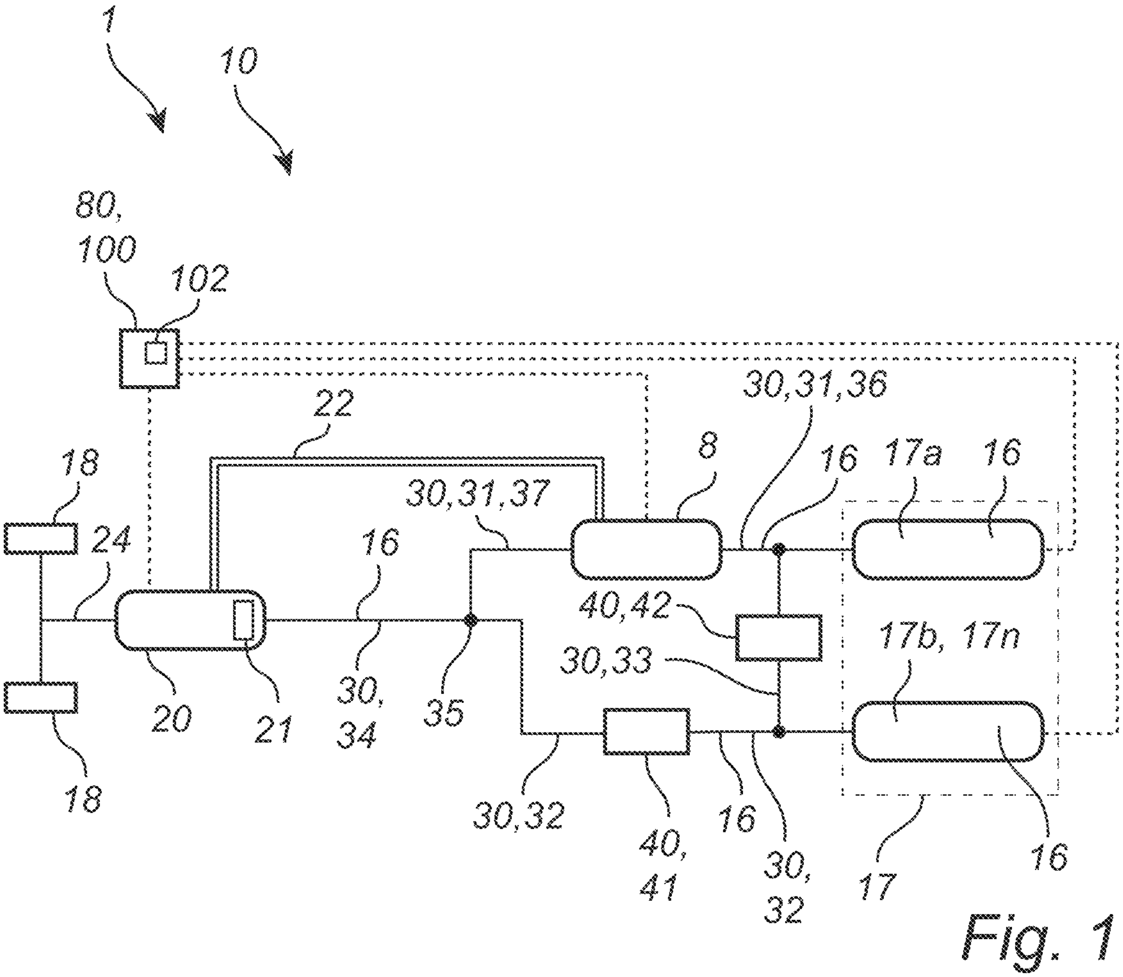
FIG. 1 schematically illustrates an exemplary vehicle comprising a powertrain system, including at least an internal combustion engine, gaseous fuel tank system and a compressor assembly, according to an example.

The detailed description set forth below provides information and examples of the disclosed technology with sufficient detail to enable those skilled in the art to practice the disclosure.

The present disclosure is at least partly based on the insight that powertrain systems for vehicles including an internal combustion engine (ICE) operating on gaseous fuels, such as a hydrogen-based gas fuel or natural gas fuel, e.g. LNG or CNG, may be an attractive alternative to traditional gasoline or diesel-powered engines. Such ICE systems may produce fewer harmful emissions compared to gasoline and diesel.

However, despite the progress in the industry, there is still a challenge in delivering the fuel to the ICE in an efficient manner and at a correct pressure. Purely by way of example, conventional hydrogen fuel storage systems for heavy-duty vehicles may generally include one or more high-pressure tanks, typically pressurized at about 700 bar. An ICE system utilizing a high-pressure direct injection fuel system may be denoted as a high-pressure direct injection ICE system. Moreover, a high-pressure direct injection (HPDI) ICE running on gaseous fuel may generally require a high enough fuel pressure to be effective and to enable peak power output. While the fuel tanks are initially pressurized with high enough pressure to enable the ICE to operate in an efficient manner, the pressure in the tanks will eventually decrease as the fuel is used by the ICE and the tanks are emptied. When the pressure in the tanks are too low for ensuring the operation of the ICE, the fuel needs to be pressurized by a compressor to enable high efficiency of the ICE and peak power.

Moreover, in such ICE systems, e.g. high-pressure direct injection ICE systems, the compressor may typically be powered by the ICE and/or another power source, such as a generator and/or a hydraulic system. Therefore, there is a need for extra power output from powertrain system, e.g. from the ICE, when the compressor needs to be operated and thus powered by the powertrain system, such as from the ICE. At some operating points of the powertrain system, the extra power used by the compressor can lead to an efficiency loss from the powertrain system. For example, the ICE may typically not have a constant efficiency. Rather, the efficiency of the ICE may typically vary with ICE speed and ICE torque. It should be noted that the compressor assembly may in some examples be powered indirectly by the ICE, e.g. by the means of a hydraulic pump coupled to the ICE, which in its turn is powering the compressor.

To this end, there is a disadvantage in operating the compressor if strictly not needed, i.e. operating the compressor in a non-strategic way, as it may lead to reduced efficiency of the ICE, and thus leading to shorter range of the vehicle.

One example of operating the powertrain system to overcome this challenge may be to use gas directly from the fuel tanks until the tank pressure has been reduced to a pressure level below the needed gas pressure for the ICE and then start using the compressor. However, operating the compressor in this way may typically lead to that the ICE efficiency is reduced at some point in time due to running the compressor which will lead to an overall worse efficiency of the powertrain and thus reduce the range of the truck.

For these and other reasons, there is still a need for improving operation of the compressor assembly in a powertrain system having a gaseous ICE on the basis of the operation of the ICE.

To remedy this, the present disclosure provides a powertrain system and methods using a compressor assembly to pressurize a gaseous fuel based on current and predicted operating conditions of the ICE.

The disclosure may thus seek to enhance the efficiency of a powertrain system for a vehicle including at least an internal combustion engine operable on a gaseous fuel and a compressor assembly. A technical benefit may include providing an improved usage of the compressor assembly based on the operating conditions of the ICE.

The proposed powertrain system allows for better determining the optimal conditions for enhanced efficiency of the ICE and the powertrain system by assessing the impact of operating the compressor assembly to attain requisite gas pressure rather than directly sourcing it from fuel tanks. As such, the compressor assembly can be controlled in an improved manner, including e.g. operating situations where increased efficiency of the powertrain system is foreseeable, where activating the compressor may become a priority. By determining operational parameters of the powertrain system, such as current engine efficiency, pressure levels in one or more gaseous fuel tanks and changes in engine efficiency, and controlling the powertrain system on the basis of these operational parameters, it becomes possible to increase the likelihood of engaging the compressor when associated energy costs are minimized, thereby improving the utilization of the compressor assembly.

In addition, the proposed powertrain system may provide for improving the use of the pressurized fuel during varying operating conditions of the ICE and the vehicle.

The disclosure of the vehicle and the powertrain system may be particularly useful in applications where ICE is combined with a high-pressure direct injection fuel system. Hence, the powertrain system may typically comprise an internal combustion engine in the form of a high-pressure direct injection internal combustion engine. The powertrain system may in addition, or alternatively be used in combination with a spark-ignited internal combustion engine, such as a spark-ignited high pressure direct inject internal combustion engine or a diffusion combustion internal combustion engine.

FIG. 1 schematically illustrates a vehicle 1 in the form of an exemplary heavy-duty truck. It should be noted that the vehicle may be any type of vehicle suitable for transporting goods, materials and/or people, such as bulk material from one location to another. For example, the vehicle 1 may be an excavator, a loader, an articulated hauler, a dump truck, a truck or any other suitable vehicle known in the art. In some embodiments, the vehicle 1 may be driven by an operator. In other embodiments, the vehicle 1 may be an autonomous vehicle that is controlled by a vehicle motion management (VMM) unit configured to individually control vehicle units and/or vehicle axles and/or wheels of the vehicle. For ease of reference, the following description refers to vehicles in the form of heavy-duty vehicles, such as trucks.

The vehicle 1 illustrated in FIG. 1 comprises a powertrain system 10. The powertrain system 10 comprises an internal combustion engine (ICE) 20. Throughout the description of the powertrain system, the ICE may be denoted as the internal combustion engine, the combustion engine or simply as the engine. The ICE 20 is configured to provide power for propelling the vehicle 1. The ICE 20 is configured to be connected to one or more ground engaging members 18, such as one or more wheels of the vehicle 1, as illustrated in FIG. 1. The ICE 20 is here operatively connected to one or more ground engaging members 18 by a powertrain shaft assembly 24. In this manner, torque from the ICE 20 can be transferred to the ground engaging members 18.

The ICE 20 is an ICE configured to be operable on a gaseous fuel 16. By way of example, the gaseous fuel is a hydrogen-based fuel. In particular, the ICE 20 is operable on pure hydrogen gas as the fuel. Hence, the ICE 20 is here a hydrogen ICE. In a hydrogen ICE, the ICE 20 is configured to combust the pressurized gaseous fuel in the form of pressurized hydrogen. Such combustion process of hydrogen produces water as by-product in the exhausts. The ICE 20 may e.g. be a pure hydrogen ICE, such as a hydrogen high-pressure direct injection ICE. In other examples, the ICE 20 is a hydrogen-based ICE operating on a mix of hydrogen fuel and another fuel, such as diesel fuel. In other examples, the ICE 20 is a natural gas ICE, i.e. an ICE configured to be operable on a natural gas fuel. Hence, the ICE 20 is operable on a gaseous fuel 16. These types of ICEs are commonly known in the art, and thus not further described herein.

As is commonly known in the art, the ICE 20 generally comprises one or more cylinders (not illustrated) having corresponding combustion chambers and reciprocating pistons (not illustrated). Such type of ICE 20 also comprises a fuel injection system having one or more fuel injectors for injecting the pressurized gaseous fuel into the one or more cylinder. In order to deliver the fuel to the fuel injector(s), the ICE 20 may also comprise a so-called fuel rail arrangement 21. In this context, a fuel rail arrangement 21 may generally refer to a component in the fuel injection system that delivers pressurized fuel to the fuel injectors. Its primary purpose is to distribute fuel evenly to the injectors, which then spray the fuel into the combustion chambers. The fuel rail arrangement 21 is typically mounted on, or in, the ICE 20, and configured to connect to the fuel injectors through short fuel lines. The fuel rail arrangement 21 is arranged and configured to maintain a certain pressure to ensure proper fuel atomization and combustion in the ICE 20. The pressure of the fuel can further be regulated by a fuel pressure regulator (not illustrated) in the ICE 20, as is commonly known.

The fuel rail arrangement 21 is arranged and configured to receive the fuel from a gaseous fuel tank system 17. As such, the ICE 20 is here configured to receive the pressurized hydrogen gas from the gaseous fuel tank system 17, as illustrated in FIG. 1

As further illustrated in FIG. 1, the gaseous fuel tank system 17 comprises a set of fuel tanks 17*a* to 17*n*. More specifically, the fuel tanks are gaseous fuel tanks 17*a* to 17*n*. The gaseous fuel tanks 17*a* to 17*n* are configured to store pressurized gaseous fuel, such as hydrogen gas fuel 16. Although the pressurized gaseous fuel may be either hydrogen gas or natural gas, the following description will refer to the pressurized gaseous fuel as pressurized hydrogen-based gas fuel, pressurized hydrogen gas fuel, or simply as pressurized fuel, or merely as fuel 16. The fuel 16 is generally an integral part of the fuel tanks, at least in a non-emptied state.

In other examples, the vehicle 1 may be a hybrid vehicle, comprising a set of fuel consuming power sources, such as a fuel cell system and the ICE 20.

As illustrated in FIG. 1, the vehicle 1 further comprises a controller 80 configured to control at least some of the operations of the powertrain system 10, as described below. The controller 80 may be an integral part of a computer system 100, and may also comprise a processing circuitry 102.

Turning again to FIG. 1 and the components of the powertrain system 10. As depicted in FIG. 1, the gaseous fuel tank system 17 comprises the set of fuel tanks 17*a* to 17*n*. for storing pressurized hydrogen fuel 16. Each one of the fuel tanks 17, 17*a* to 17*n* is configured and arranged to store pressurized hydrogen fuel 16. Each one of the fuel tanks 17, 17*a* to 17*n* is also configured and arranged to supply fuel 16 to the ICE 20 via a fuel conduit arrangement 30, as illustrated in FIG. 1.

Accordingly, the powertrain system 10 further comprises the fuel conduit arrangement 30. The fuel conduit arrangement 30 is configured to be in fluid communication with the number of tanks 17, 17*a* to 17*n*. The fuel conduit arrangement 30 is here also configured to contain and transport fuel 16 from the fuel tanks 17, 17*a* to 17*n* to the ICE 20.

More specifically, as illustrated in FIG. 1, the fuel conduit arrangement 30 is configured to be in fluid communication with each one of the fuel tanks of the set of fuel tanks 17, 17*a* to 17*n*. Hence, by way of example, the fuel conduit arrangement 30 comprises a fuel conduit 31 extending from a fuel tank 17 to the ICE 20. In this context, the term "fluid communication" refers to transfer of gaseous fluids. Hence, the term "fluid communication" typically refers to a gaseous fluid communication. The term "fluid communication" thus typically means that two components, such as the ICE and the fuel tanks are in gaseous communication with each other.

In FIG. 1, the fuel conduit arrangement 30 comprises a set of fuel conduits, including a first fuel conduit 31 and a second fuel conduit 32. Each one of the fuel conduits is fluidly connected to a corresponding fuel tank 17. Hence, by way of example, as illustrated in FIG. 1, the fuel conduit arrangement 30 comprises the first fuel conduit 31 being fluidly connected to a first fuel tank 17*a* and the second fuel conduit 32 being fluidly connected to a second fuel tank 17*b*. It should be noted that the example of FIG. 1 comprises two fuel conduits 31, 32 being configured to fluidly connect the two fuel tanks 17*a*, 17*b* to the ICE 20, respectively. However, the number of fuel conduits generally varies in view of the number of fuel tanks 17. As such, each one of the fuel tanks of the powertrain system 10 is configured to be fluidly connected to the ICE 20 by a corresponding fuel conduit. Hence, the powertrain system 10 may comprise any number of fuel tanks 17*a* to 17*c*, while the fuel conduit arrangement 30 may comprise any number of fuel conduits.

As such, in FIG. 1, each one of the fuel tanks 17*a*, 17*b* is configured to be fluidly connected to the ICE 20 via the fuel conduit arrangement 30 by a corresponding fuel conduit 31, 32. Hence, as illustrated in FIG. 1, the first fuel conduit 31 of the fuel conduit arrangement 30 is fluidly connected to a first fuel tank 17*a* of the fuel tanks 17, and the second conduit 32 of the fuel conduit arrangement 30 is fluidly connected to a second fuel tank 17*b* of the fuel tanks 17.

To this end, the fuel conduit arrangement 30 comprises the first fuel conduit 31 and the second fuel conduit 32.

As may also be gleaned from FIG. 1, the fuel tanks 17, 17*a* to 17*b* are thus arranged in a parallel configuration. Accordingly, it should also be noted that the fuel tanks 17, 17*a* to 17*n* are here arranged in a parallel fuel tank configuration. In this context, a parallel configuration is different to a series configuration of fuel tanks.

Each one of the fuel tanks 17, 17*a* to 17*n* may be provided in the form of a large container that stores the vehicle's fuel. Its primary function is to store fuel securely and provide a constant supply to the ICE 20. Each one of the fuel tanks may be located at the rear of the vehicle, underneath the chassis or body, or at any other location on, or in, the vehicle 1. Each one of the fuel tanks 17, 17*a* to 17*n* may often comprise additional components such as fuel level sensors, vents, and filler necks for refueling. These types of components are commonly known in the art, and thus not further described herein.

Further, as depicted in FIG. 1, the fuel conduits 31, 32 are here arranged to converge at a common junction point 35 of the fuel conduit arrangement 30.

Also, as depicted in FIG. 1, the fuel conduits 31, 32 are arranged to fluidly connect to the ICE 20 via a common ICE inlet fuel conduit 34. The common ICE inlet fuel conduit 34 is here an integral part of the fuel conduit arrangement 30. However, in other examples, the common ICE inlet fuel conduit 34 may be an integral part of the ICE 20, which is then fluidly connected to the conduit(s) of the fuel conduit arrangement 30.

Accordingly, the fuel conduits 31, 32 are fluidly connected to the common ICE inlet fuel conduit 34.

Turning again to FIG. 1. The powertrain system 10 comprises a compressor assembly 8. The compressor assembly 8 is disposed in the fuel conduit arrangement 30. The compressor assembly 8 is further arranged downstream of at least one of the fuel tanks of the set of fuel tanks 17*a* to 17*n*. In FIG. 1 the compressor assembly 8 is arranged downstream the first fuel tank 17*a* of the fuel tank system 17.

Accordingly, the compressor assembly 8 is arranged in a gaseous fuel conduit in-between the ICE and the gaseous fuel tank system 17. More specifically, the compressor assembly 8 is arranged in a gaseous fuel conduit in-between the ICE 20 and the gaseous fuel tank system 17, wherein the gaseous fuel conduit here is the first fuel conduit 31 and the gaseous fuel tank system 17 is the first fuel tank 17*a*. As such, the compressor assembly 8 is arranged in the first fuel conduit 31 and further arranged in-between the ICE 20 and the first fuel tank 17*a* of the gaseous fuel tank system 17, as depicted in FIG. 1.

As illustrated in FIG. 1, the compressor assembly 8 is here disposed in the first fuel conduit 31. The first fuel conduit 31 is arranged downstream the fuel tank 17*a*. As illustrated in FIG. 1, first fuel conduit 31 further comprises a compressor assembly inlet conduit 36 and a compressor assembly outlet conduit 37. The compressor assembly outlet conduit 37 extends between the compressor assembly 8 and the ICE 20. Hence, compressor assembly outlet conduit 37 may be considered as an inlet conduit to the ICE 20, which here intersects with the common ICE inlet fuel conduit 34 at the common junction point 35 of the first and second fuel conduits 31, 32.

In FIG. 1, the compressor assembly 8 is configured to be powered by the ICE 20. As such, the ICE 20 is arranged and configured to operate the compressor assembly 8. Powering the compressor assembly 8 by means of the ICE 20 here involves connecting the ICE 20 to the compressor assembly through a mechanical linkage 22, as illustrated in FIG. 1.

It is also possible that the compressor assembly 8 can be powered in other ways, such as indirectly by the ICE 20 and/or directly by an auxiliary power source, such as a generator. For example, the powertrain system 10 may include a hydraulic pump (not shown) operatively connected to the ICE 20 which through a hydraulic circuit powers the compressor assembly 8. In addition, or alternatively, the powertrain system 10 may include a generator (not shown) operatively connected to the ICE 20, which generates electricity which powers the compressor assembly 8.

The compressor assembly 8 is further configured to pressurize the gaseous fuel 16 from at least one fuel tank of the fuel tank system 17, which in FIG. 1 is the fuel tank 17*a*.

Moreover, the powertrain system 10 is operable in a first powertrain operational mode M1, in which gaseous fuel 16 is supplied from at least one of the gaseous fuel tanks of the set of gaseous fuel tanks 17, 17*a* to 17*n* to the ICE 20 in a non-operational mode C1 of the compressor assembly 8.

Also, the powertrain system 10 is operable in a second powertrain operational mode M2, in which gaseous fuel 16 from at least one of the gaseous fuel tanks is pressurized by the compressor assembly 8 in an operational mode C2 of the compressor assembly 8, and further supplied to the ICE 20.

As such, the compressor assembly 8 operable in two different modes, the non-operational mode C1 and the operational mode C2. In the non-operational mode C1, the compressor assembly 8 is not powered by the ICE 20. In the operational mode C2, the compressor assembly 8 is powered by the ICE 20.

The control of the various mode is performed by the controller 80. Accordingly, as illustrated in FIG. 1, the controller 80 is in communication with the ICE 20, the compressor assembly and the fuel tanks 17*a* to 17*n* of the fuel tank assembly 17.

More specifically, as illustrated in FIG. 1, the powertrain system 10 is operable in the first powertrain operational mode M1, in which gaseous fuel 16 is supplied from the second fuel tank 17*b* of the fuel tank system 17 to ICE 20 when the compressor assembly 8. is in the non-operational mode C1. Accordingly, gaseous fuel 16 is supplied from the fuel tank system 17 directly to the ICE 20.

Typically, in the first powertrain operational mode M1, gaseous fuel 16 is supplied from the first and second fuel tanks 17*a* and 17*b* to the ICE 20 via the second fuel conduit 32. This is possible when the pressure levels of the fuel tanks 17*a* and 17*b* are sufficiently high. More specifically, as further described herein, in the first powertrain operational mode M1, gaseous fuel is supplied from the first fuel tank 17*a* to the ICE 20 via an intermediate fuel conduit 33 and then via the second fuel conduit 32 to the ICE 20, while gaseous fuel 16 is supplied from the fuel tank 17*b* via the second fuel conduit 32 to the ICE 20. This is possible when the pressure levels of the fuel tanks 17*a* and 17*b* are sufficiently high. In addition, the compressor assembly 8 is here set in the non-operational mode C1 by the controller 80. As such, in the non-operational mode C1 of the compressor assembly 8, the compressor assembly 8 is by-passed when supplying gaseous fuel 16 to the ICE 20 from the fuel tank system 17.

Also, the powertrain system 10 is operable in the second powertrain operational mode M2, in which gaseous fuel 16 is supplied from the gaseous fuel tank 17*a* and pressurized by the compressor assembly 8 in the operational mode C2 of the compressor assembly 8, and subsequently supplied to the ICE 20. Accordingly, gaseous fuel 16 is supplied from the fuel tank system 17 to the ICE 20 via the compressor assembly 8.

By way of example, in the second powertrain operational mode M2, in which the compressor assembly 8 is in the operational mode C2 (as the pressure level in the first fuel tank 17*a* is determined to be lower than a needed pressure level for the ICE 20), gaseous fuel 16 is typically supplied from the fuel tanks 17*a* and 17*b* to the ICE 20 via the first and second fuel conduits 31, 32, respectively. This is controlled by the controller 80 when the pressure level of at least the first fuel tank 17*a* is too low for the ICE 20. More specifically, as further described herein, in the second powertrain operational mode M2, and in the operational mode C2 of the compressor assembly 8, gaseous fuel 16 is supplied from the first fuel tank 17*a* through the compressor assembly 8, and then supplied to the ICE 20 via the first fuel conduit 31, while gaseous fuel 16 from the second fuel tank 17*b* can be supplied via the second fuel conduit 32 to the ICE 20.

The compressor assembly 8 can be provided in several different configurations. By way of example, the compressor assembly 8 is a reciprocating compressor having a compressor cylinder for accommodating a compressor piston.

The compressor assembly 8 thus includes a compression chamber or a cylinder in which the working fluid (fuel 16) is introduced. Inside the chamber, the working fluid (fuel 16) undergoes a compression process. This process may typically involve the working fluid (fuel 16) being compressed, i.e. the fuel 16 is pressurized.

After the fuel 16 has been pressurized in, and by, the compressor assembly 8, the fuel 16 is directed from the compressor assembly 8 to the ICE 20, and used as fuel by the ICE 20.

As mentioned above, the operation of the compressor assembly 8 is controlled by the controller 80. Accordingly, the powertrain system 20 comprises the controller 80, which is in communication with the compressor assembly 8.

The controller 80 is here configured to receive data indicative of a current engine efficiency parameter.

Alternatively, or in addition, the controller 80 is configured to receive data indicative of current engine torque and current engine speed, and further configured to determine the current engine efficiency parameter based on the current engine torque and current engine speed.

Moreover, the controller 80 is here configured to receive data indicative of pressure levels in one or more gaseous fuel tanks of the set of gaseous fuel tanks. Typically, the controller 80 is configured to receive data of pressure levels of all gaseous fuel tanks of the set of gaseous fuel tanks 17*a* to 17*n*.

In addition, the controller 80 is configured to predict, based on the received (or determined) current engine efficiency parameter and received data indicative of at least one pressure level of at least one gaseous fuel tank of the set of gaseous fuel tanks, a first potential change in the engine efficiency for the first powertrain operational mode M1.

Further, the controller 80 is configured to predict, based on the received (or determined) current engine efficiency parameter, received data indicative of at least one pressure level of at least one gaseous fuel tank of the set of gaseous fuel tanks, and a needed power output from the ICE 20 for operating the compressor assembly 8 to provide a predetermined pressure fuel level, a second potential change in the engine efficiency for the second powertrain operational mode M2.

The needed power output from the ICE 20 is e.g. derived from data indicative of the pressure in the low-pressure tank, such as the pressure of the fuel tank 17*a* and data indicative of the efficiency of the ICE 20 (i.e. the current efficiency parameter).

Moreover, the predetermined pressure fuel level may be determined based on the estimated demand from the ICE. As example, the predetermined pressure fuel level may be about 350 bar for an ICE, such as an HPDI ICE operable on hydrogen gas. However, the predetermined pressure fuel level may vary for different ICEs and different powertrain systems.

Subsequently, the controller 80 is configured to compare the predicted first potential change in the engine efficiency with the predicted second potential change in the engine efficiency.

Finally, the controller 80 is configured to control the compressor assembly 8 either in the operational mode C2 or in the non-operational mode C1 based on the comparison. In some examples, the controller 80 may comprise a number of sub-controllers (not shown), wherein a first sub-controller is configured to control the compressor assembly 8, a second sub-controller is configured to control the ICE 20, and a third sub-controller is configured to control the fuel tanks 17. In addition, the sub-controllers are configured to communicate with each other.

By the above operations of the controller 80, the controller 80 is allowed to predict whether operating the compressor assembly 8 will lead to that the ICE 20 operates in a more efficient operating point due to the power output from the ICE 20 added to operate the compressor assembly 8. If it is predicted that the ICE 20 can operate in a more efficient operating point by powering the compressor assembly 8 to operate in the operational mode, the controller 80 determined to control the compressor assembly 8 to operate in the operational mode so as to compress gas from the fuel tanks, such as the fuel tank 17*a* in FIG. 1, which may have a gas pressure below a predetermined threshold, such as 300 bar) instead of taking the fuel from a tank, such as the fuel tank 17*b* that have a pressure higher the than predetermined threshold.

On the other hand, if the controller 80 predicts that the efficiency of the ICE 20 will decrease the compressor assembly 8 is controlled to, or in, the non-operational mode. In other words, the controller 80 determines that the compressor assembly 8 should not be run and the fuel should instead be taken directly from the tank, such as the tank 17*b*, that has sufficiently high gas pressure. In this manner, the overall efficiency of the powertrain system 10 may be increased which will provide a longer range of the vehicle 1. It should be noted that the controller 80 is typically configured to control the compressor assembly 8 in operating conditions of the tanks 17, 17*a* to 17*n*, where there is at least one tank with low gas pressure and at least one tank with high enough gas pressure.

Hereby, there is provided a more dynamic and precis regulation of the fuel 16 from the fuel tanks 17, 17*a* to 17*n* to the ICE 20, which is based on predicted engine operating conditions.

By the above operations of the controller 80, the controller 80 is configured to predict if the ICE efficiency is increased by running the compressor assembly 8. In that case, the controller 80 determines to operate the compressor assembly with fuel from the fuel tank with low pressure instead of taking gas from a fuel tank with high pressure. In addition, or alternatively, the controller 80 is configured to predict if the ICE efficiency is decreased by operating the compressor assembly 8. In that case, the controller 80 determines not to operate the compressor assembly 8, while controlling the powertrain system 10 to direct fuel from a tank with high pressure.

The comparison of the predicted first potential change in the engine efficiency with the predicted second potential change in the engine efficiency can be performed in several different manners by the controller 80.

In one example, the controller 80 compares the predicted first potential change in the engine efficiency with the predicted second potential change in the engine efficiency, and decides to control the compressor assembly 8 based on the most favorable engine efficiency level resulting from the predicted first potential change in the engine efficiency and the predicted second potential change in the engine efficiency.

By way of example, if the predicted second potential change in the engine efficiency is higher than the predicted first potential change in the engine efficiency, the controller 80 is configured to control the compressor assembly 8 in the operational mode C2, such that the compressor assembly 8 can pressurize gaseous fuel 16 to the predetermined pressure fuel level.

On the other hand, if the predicted first potential change in the engine efficiency is equal to, or higher than, the predicted second potential change in the engine efficiency, the controller 80 is configured to control the compressor assembly 8 in the non-operational mode C1, allowing gaseous fuel 16 from at least one of the gaseous fuel tanks of the set of gaseous fuel tanks 17, 17*a* to 17*n* to be supplied to the ICE 20.

In FIG. 1, the fuel 16 is thus supplied form both the first fuel tank 17*a* and the second fuel tank 17*b* to the ICE 20, i.e. when the compressor assembly 8 in the non-operational mode C1 and the predicted first potential change in the engine efficiency is equal to, or higher than, the predicted second potential change in the engine efficiency.

To sum up, the controller 80 is thus configured to operate the compressor assembly in the operational mode to pressurize fuel from one or more fuel tanks if the predicted second potential change in the engine efficiency is higher than the predicted first potential change in the engine efficiency, operate the compressor assembly in the non-operational mode if the predicted first potential change in the engine efficiency is equal or higher than the predicted second potential change in the engine efficiency.

The controller 80 is here also configured to determine pressure levels of each individual fuel tank 17*a* to 17*n* of the fuel tank system 17, and control the compressor assembly 8 based on pressure levels of each individual fuel tank of the fuel tank system 17.

Data indicative of the engine efficiency parameter may be received by the controller 80. Alternatively, or in addition, the engine efficiency parameter is determined by the controller 80 from received data indicative of current engine torque and current engine speed. Determining engine efficiency from engine torque and engine speed belongs to common general knowledge within the field of engines, and thus not further described.

In an extended example of the powertrain system 10, the control 80 is also configured to receive data indicative of current engine torque and current engine speed, and further configured to determine the current engine efficiency parameter based on the current engine torque and current engine speed. The current engine torque and current engine speed can be monitored by one or more sensors as is commonly known in the art, and/or be monitored by an engine control unit, and then transferred to the controller 80.

By way of example, the engine speed is monitored by a sensor, such as a speed sensor, while the engine torque is calculated by the controller 80 from received input data from one or more engine sensors in combination with a gas pedal position configured to measure the position of the gas pedal. In some examples, the computer system 100 may include both the engine control unit and the controller 80 of the powertrain system 10. In other examples, the control 80 may at least partly include the engine control unit.

In addition, or alternatively, in an extended example of the powertrain system 10, the controller 80 is further configured to determine pressure levels of each one of the gaseous fuel tanks 17, 17*a* to 17*n* of the set of gaseous fuel tanks17, 17*a* to 17*n*. Moreover, in this example, the controller 80 is also configured to predict, based on the current engine efficiency parameter and received data indicative of pressure levels of each one of the gaseous fuel tanks, the first potential change in the engine efficiency for the first powertrain operational mode M1. Also, in this example, the controller 80 is configured to predict, based on the current engine efficiency parameter, the pressure levels of each one of the gaseous fuel tanks 17, 17*a* to 17*n*, and a needed power output from the ICE 20 for operating the compressor assembly 8 to provide the predetermined pressure fuel level, the second potential change in the engine efficiency for the second powertrain operational mode M2.

Hereby, there is provided an even more dynamic and precis regulation of the fuel 16 from the fuel tanks 17, 17*a* to 17*n* to the ICE 20, which is based on predicted engine operating conditions.

The powertrain system 10 may also include one or more fuel control valves. The fuel control valves may form a fuel control valve arrangement 40. The fuel control valve arrangement 30 here comprises a set of fuel control valves 41, 42.

More specifically, the fuel control valve arrangement 40 is disposed in the fuel conduit arrangement 30. The fuel control valve arrangement 40 comprises a first fuel control valve 41. The first fuel control valve 41 is disposed in the fuel conduit arrangement 30 and in-between the second fuel tank 17*b* and the ICE 20. The first control valve 41 is configured to regulate a flow of the pressurized fuel 16 from the second fuel tank 17*b* to the ICE 20.

The first control valve 41 is controlled by the controller 80. Hence, the first control valve 41 is in communication with the controller 80.

In FIG. 1, the first control valve 41 is controlled to prevent fuel 16 to flow from the second fuel tank 17*b* to the ICE 20 when fuel 16 is supplied from the first fuel tank 17*a*. In other words, the first control valve 41 is controlled to prevent fuel 16 to flow from the second fuel tank 17*b* to the ICE 20 when the compressor assembly 8 is in the operational mode C2.

The first fuel control valve 41 can be provided in several different manners. In one example, the first fuel control valve 41 is a pressure regulator valve. In another example, the first fuel control valve 41 is flow block valve. In another example, the first fuel control valve 41 is a flow control valve. Accordingly, the first fuel control valve 41 is provided in the form of a pressure regulator valve, a flow block valve or a flow control valve.

The first fuel control valve 41 should at least be configured to open and close the flow passage of the second fuel conduit 32. Hence, the first fuel control valve 41 is configured to regulate flow of fuel through blocking or stopping the flow of fuel through the fluid conduit 32. Examples of fuel control valves can be shut-off valves or isolation valves used to control the passage of fluid, preventing or allowing flow as needed.

As used herein, a flow control valve is configured to regulate a rate or speed of fuel flow through the flow control valve. As such, a flow control valve is designed to control the volume of fluid passing through it. The flow control valve typically controls flow by adjusting the size of the valve opening or by throttling the flow.

The choice between the valves may generally depend on the specific requirements of the application and the desired control parameters for the fuel being used.

It should thus be appreciated that the term "regulating a flow of pressurized fuel" may refer to a regulation of a fuel flow rate, a regulation of a fuel pressure, and/or a combination of a regulation of fuel flow rate and fuel pressure. The term can thus be interpreted to cover different scenarios, including regulating only the flow rate, only the pressure, or both flow rate and pressure. The flow rate may refer to a regulation of the volumetric flow rate and/or a regulation of the mass flow rate.

In addition, the fuel control valve arrangement 40 comprises a second fuel control valve 42. As illustrated in FIG. 1, the second fuel control valve 42 is disposed in the intermediate fuel conduit 33. The intermediate fuel conduit 33 extends between the first fuel conduit 31 and the second fuel conduit 32. The intermediate fuel conduit 33 is integral part of the fuel conduit arrangement 30.

More specifically, the intermediate fuel conduit 33 extends from a position on the first fuel conduit 31 being located in-between the compressor assembly 8 and the first fuel tank 17*a*. In other words, the intermediate fuel conduit 33 extends from a position on the first fuel conduit 31 being upstream the compressor assembly 8 and downstream the first fuel tank 17*a*.

The intermediate fuel conduit 33 is thus arranged to permit flow of fuel 16 between the first fuel conduit 31 and the second fuel conduit 32. More specifically, the intermediate fuel conduit 33 is arranged to permit flow of fuel 16 from the first fuel conduit 31 to the second fuel conduit 32, i.e. from the position of the first fuel conduit 31 being located in-between the compressor assembly 8 and the first fuel tank 17*a*, and to the second fuel conduit 31.

By the arrangement of the second fuel control valve 42 in the intermediate fuel conduit 33, it becomes possible to regulate a flow of the pressurized fuel 16 in the intermediate fuel conduit 33.

The second fuel control valve 42 is also controlled by the controller 80. Hence, the second fuel control valve 42 is in communication with the controller 80.

In FIG. 1, the second fuel control valve 42 is controlled to allow fuel 16 to flow from the first fuel tank 17*a* to the second fuel conduit 32, and then to the ICE 20, when the pressure level in the first fuel tank 17*a* is sufficiently high for meeting the demand from the ICE 20. As such, the second fuel control valve 42 is controlled to allow fuel 16 to flow from the first fuel tank 17*a* to the second fuel conduit 32, and then to the ICE 20, when the pressure level in the first fuel tank 17*a* is sufficiently high and when the controller 80 controls the compressor assembly 8 to its non-operational mode C1, and/or when the compressor assembly 8 is in its non-operational mode C1. In the non-operation mode C1 of the compressor assembly 8, no fuel is supplied through the compressor assembly 8.

Moreover, the second fuel control valve 42 is controlled to allow fuel 16 to flow from the second fuel tank 17*b* to the first fuel conduit 31 when the controller 80 controls the compressor assembly 8 to, and/or in, its operational mode C2.

Moreover, in FIG. 1, the second fuel control valve 42 is controlled to prevent fuel 16 to flow from the second fuel tank 17*b* to the first fuel conduit 31 when the controller 80 controls the compressor assembly 8 to, and/or in, its operational mode C2.

Accordingly, the ICE 20 can be supplied with fuel 16 from all fuel tanks 17, 17*a* to 17*n*, such as fuel tanks 17*a* and 17*b*, when the pressure levels of the tanks 17*a* to 17*n* are sufficiently high, and when the compressor assembly 8 is in the non-operational mode C1.

The second fuel control valve 42 can be provided in several different manners. In one example, the second fuel control valve 42 is a pressure regulator valve. In another example, the second fuel control valve 42 is flow block valve. In another example, the second fuel control valve 42 is a flow control valve. Accordingly, the second fuel control valve 42 is provided in the form of a pressure regulator valve, a flow block valve or a flow control valve.

The second fuel control valve 42 should at least be configured to open and close the flow passage of the intermediate fuel conduit 33. Hence, the second fuel control valve 42 is configured to regulate flow of fuel through blocking or stopping the flow of fuel through the intermediate fluid conduit 33. Examples of fuel control valves can be shut-off valves or isolation valves used to control the passage of fluid, preventing or allowing flow as needed. The details of the first fuel control valve 41 may be likewise applicable to the second control valve 42.

It is to be noted that the controller 80 is typically configured to control flow of fuel through the compressor assembly 8 by also controlling any one of the first and second control valves 41, 42 in response to the above comparison.

The pressure levels of the fuel tanks 17, 17*a* to 17*n* are typically measured level. The pressure levels of the fuel tanks 17, 17*a* to 17*n* can be measured by a pressure sensor arranged in each one of the fuel tanks. The measured pressure level is transferred to the controller 80 and/or stored in a memory of the controller 80.

Accordingly, in one example, the controller 80 is configured to compare a fuel pressure of the fuel tanks with a demanded fuel pressure level from the ICE 10. The demanded fuel pressure level here corresponds to the predetermined pressure fuel level.

As mentioned herein, the demanded fuel pressure (predetermined pressure fuel level) from the ICE 20 may be a demanded fuel rail injection pressure of the ICE 20. Hence, in one example, the controller 80 is configured to compare fuel pressure of the fuel tanks with the demanded fuel rail injection pressure of the ICE 20.

In another example, the controller 80 is configured to compare an individual fuel pressure of each one of the fuel tanks with a demanded fuel pressure from the ICE 8.

The controller 80 may also be configured to take a demanded fuel flow rate into consideration, the demanded fuel flow rate may either be a fuel volumetric flow rate or a fuel mass flow rate. The controller 80 may for example determine to control the compressor assembly 8 based on pressure level and fuel flow.

The demanded fuel pressure (predetermined pressure fuel level) of the ICE 20 can also be determined by the controller 80. The predetermined pressure fuel level may refer to, by way of example, the demanded fuel injection pressure for the ICE 20. The predetermined pressure fuel level may also be derivable from data sheets, look-up tables or the like. In addition, or alternatively, the demanded fuel injection pressure for the ICE 20 can be determined by the controller 80 by means of receiving operational data from the ICE 20.

The controller 80 may also be configured to determine predetermined pressure fuel level based on a pressure map of the ICE 20.

In regard to the current fuel pressure of each one of the fuel tanks of the number of fuel tanks, such measurement and/or data is generally received at the controller 80 from one or more sensors arranged in the fuel tanks. Such data may likewise be stored in a memory of the controller 80, and updated during operation of the powertrain system 10.

It should be noted that each one of the conduits 31, 32, 33, 34 etc. making up the fuel conduit arrangement 30 can be provided in the form of a pipe, a line, a hose or the like, which are standard components of a fuel supply system of a vehicle.

It should be noted that the above presentation of the powertrain system 10 should also be regarded as disclosing a method for controlling the powertrain system 10, for instance using the controller 80 and the processing circuitry 102.

Figure 3:
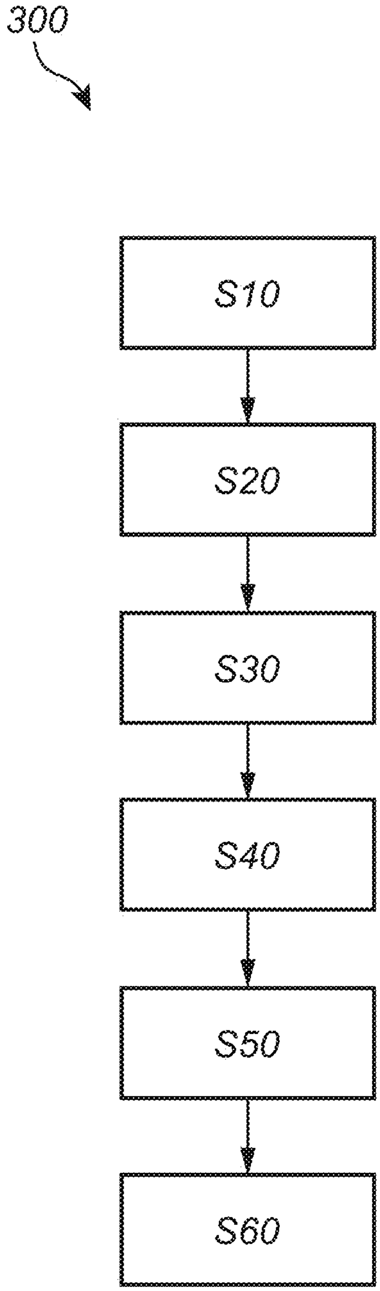
FIG. 3 is a flow chart of an exemplary method to control a powertrain system of a vehicle according to an example.

FIG. 3 is a flow chart of an exemplary method to control the powertrain system 10 of the vehicle 1 according to an example. More specifically, FIG. 3 is an exemplary computer implemented method 300 according to an example. The computer-implemented method 300 is intended for controlling for controlling the compressor assembly 8 of the powertrain system 10 for the vehicle 1. The method 300 is implemented by the controller 80 having the processing circuitry 102.

As mentioned herein, the powertrain system 10 is operable in the first powertrain operational mode, in which gaseous fuel is supplied from at least one of the gaseous fuel tanks of the set of gaseous fuel tanks to the ICE in the non-operational mode of the compressor assembly 8, and in the second powertrain operational mode, in which gaseous fuel from at least one of the gaseous fuel tanks is pressurized by the compressor assembly 8 in the operational mode of the compressor assembly 8, and subsequently supplied to the ICE 20.

As illustrated in FIG. 3, the method comprises a step S10 of receiving data indicative of a current engine efficiency parameter. The processing circuitry 102 is configured to implement this step.

Further, the method 300 comprises a step S20 of receiving data indicative of pressure levels in one or more gaseous fuel tanks of the set of gaseous fuel tanks. The processing circuitry 102 is configured to implement this step.

Next, the method comprises a step S30 of predicting, based on the current engine efficiency parameter and data indicative of at least one pressure level, a first potential change in the engine efficiency for the first powertrain operational mode. The processing circuitry 102 is configured to implement this step.

Moreover, the method comprises a step S40 of predicting, based on the current engine efficiency parameter, at least one of the pressure levels, and a needed power output from the internal combustion engine for operating the compressor assembly to provide a predetermined pressure fuel level, a second potential change in the engine efficiency for the second powertrain operational mode. The processing circuitry 102 is configured to implement this step.

Subsequently, the method comprises a step S50 of comparing the predicted first potential change in the engine efficiency with the predicted second potential change in the engine efficiency. The processing circuitry 102 is configured to implement this step.

Finally, the method comprises a step S60 of controlling the compressor assembly based on the comparison. The processing circuitry 102 is configured to implement this step.

The method may also comprise controlling any one of the fuel control valves 31, 32, as described herein, in response to the comparison.

In some examples, there is provided a computer program product comprising program code for performing, when executed by the processing circuitry 102, the method 300 as described above.

In some examples, there is provided a non-transitory computer-readable storage medium comprising instructions, which when executed by the processing circuitry 102, cause the processing circuitry 102 to perform the method 300 as described above.

Further details of one example of a computer system that can be used as the controller 80 will now be described in relation to FIG. 2.

Figure 2:
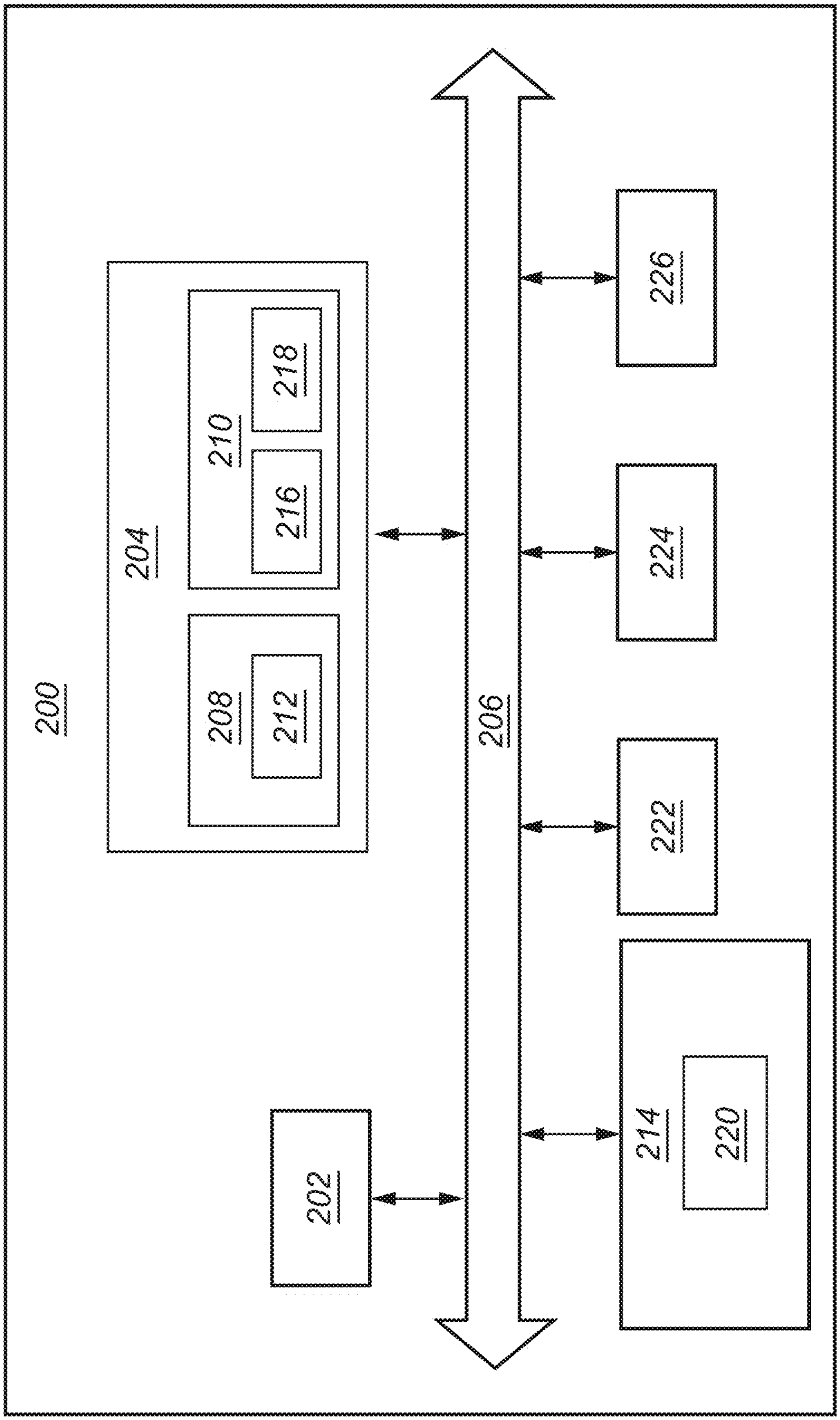
FIG. 2 is a schematic diagram of an exemplary computer system for implementing examples disclosed herein, according to an example.

FIG. 2 is a schematic diagram of a computer system 200 for implementing examples disclosed herein. The computer system 200 is adapted to execute instructions from a computer-readable medium to perform these and/or any of the functions or processing described herein. The computer system 200 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 200 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 200 may comprise at least one computing device or electronic device capable of including firmware, hardware, and/or executing software instructions to implement the functionality described herein. The computer system 200 may include processing circuitry 202 (e.g., processing circuitry including one or more processor devices or control units), a memory 204, and a system bus 206. The computer system 200 may include at least one computing device having the processing circuitry 202. The system bus 206 provides an interface for system components including, but not limited to, the memory 204 and the processing circuitry 202. The processing circuitry 202 may include any number of hardware components for conducting data or signal processing or for executing computer code stored in memory 204. The processing circuitry 202 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 202 may further include computer executable code that controls operation of the programmable device.

The system bus 206 may be any of several types of bus structures that may further interconnect to a memory bus (with or without a memory controller), a peripheral bus, and/or a local bus using any of a variety of bus architectures. The memory 204 may be one or more devices for storing data and/or computer code for completing or facilitating methods described herein. The memory 204 may include database components, object code components, script components, or other types of information structure for supporting the various activities herein. Any distributed or local memory device may be utilized with the systems and methods of this description. The memory 204 may be communicably connected to the processing circuitry 202 (e.g., via a circuit or any other wired, wireless, or network connection) and may include computer code for executing one or more processes described herein. The memory 204 may include non-volatile memory 208 (e.g., read-only memory (ROM), erasable programmable read-only memory (EPROM), electrically erasable programmable read-only memory (EEPROM), etc.), and volatile memory 210 (e.g., random-access memory (RAM)), or any other medium which can be used to carry or store desired program code in the form of machine-executable instructions or data structures and which can be accessed by a computer or other machine with processing circuitry 202. A basic input/output system (BIOS) 212 may be stored in the non-volatile memory 208 and can include the basic routines that help to transfer information between elements within the computer system 200.

The computer system 200 may further include or be coupled to a non-transitory computer-readable storage medium such as the storage device 214, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 214 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 214 and/or in the volatile memory 210, which may include an operating system 216 and/or one or more program modules 218. All or a portion of the examples disclosed herein may be implemented as a computer program 220 stored on a transitory or non-transitory computer-usable or computer-readable storage medium (e.g., single medium or multiple media), such as the storage device 214, which includes complex programming instructions (e.g., complex computer-readable program code) to cause the processing circuitry 202 to carry out actions described herein. Thus, the computer-readable program code of the computer program 220 can comprise software instructions for implementing the functionality of the examples described herein when executed by the processing circuitry 202. In some examples, the storage device 214 may be a computer program product (e.g., readable storage medium) storing the computer program 220 thereon, where at least a portion of a computer program 220 may be loadable (e.g., into a processor) for implementing the functionality of the examples described herein when executed by the processing circuitry 202. The processing circuitry 202 may serve as a controller or control system for the computer system 200 that is to implement the functionality described herein.

The computer system 200 may include an input device interface 222 configured to receive input and selections to be communicated to the computer system 200 when executing instructions, such as from a keyboard, mouse, touch-sensitive surface, etc. Such input devices may be connected to the processing circuitry 202 through the input device interface 222 coupled to the system bus 206 but can be connected through other interfaces, such as a parallel port, an Institute of Electrical and Electronic Engineers (IEEE) 1394 serial port, a Universal Serial Bus (USB) port, an IR interface, and the like. The computer system 200 may include an output device interface 224 configured to forward output, such as to a display, a video display unit (e.g., a liquid crystal display (LCD) or a cathode ray tube (CRT)). The computer system 200 may include a communications interface 226 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Moreover, the present disclosure may be exemplified by any one of the below examples.

Example 1. A powertrain system 10 for a vehicle 1, the powertrain system comprising an engine 20 operable on a gaseous fuel 16, a gaseous fuel tank system 17 having a set of gaseous fuel tanks 17*a* to 17*n* for storing pressurized gaseous fuel, the gaseous fuel tank system being configured to be in fluid communication with the engine, and further a compressor assembly 8 for pressurizing gaseous fuel, the powertrain system being operable in a first powertrain operational mode M1, in which gaseous fuel is supplied from at least one of the gaseous fuel tanks of the set of gaseous fuel tanks to the engine in a non-operational mode C1 of the compressor assembly, and in a second powertrain operational mode M2, in which gaseous fuel from at least one of the gaseous fuel tanks is pressurized by the compressor assembly in an operational mode C2 of the compressor assembly, and supplied to the engine, wherein the powertrain system further comprises a controller 80 configured to; predict, based on the current engine efficiency parameter and data indicative of at least one pressure level of at least one gaseous fuel tank of the set of gaseous fuel tanks, a first potential change in the engine efficiency for the first powertrain operational mode; predict, based on the current engine efficiency parameter, data indicative of at least one pressure level of at least one gaseous fuel tank of the set of gaseous fuel tanks, and a needed power output from the internal combustion engine for operating the compressor assembly to provide a predetermined pressure fuel level, a second potential change in the engine efficiency for the second powertrain operational mode; compare the predicted first potential change in the engine efficiency with the predicted second potential change in the engine efficiency; and control the compressor assembly either in the operational mode or the non-operational mode based on the comparison.

Example 2. Powertrain system according to example 1, wherein, if the predicted second potential change in the engine efficiency is higher than the predicted first potential change in the engine efficiency, the controller is configured to control the compressor assembly in the operational mode, such that the compressor assembly can pressurize gaseous fuel to the predetermined pressure fuel level.

Example 3. Powertrain system according to example 1 or example 2, wherein, if the predicted first potential change in the engine efficiency is equal to, or higher than, the predicted second potential change in the engine efficiency, the controller is configured to control the compressor assembly in the non-operational mode, allowing gaseous fuel from at least one of the gaseous fuel tanks of the set of gaseous fuel tanks to be supplied to the engine.

Example 4. Powertrain system according to any one of examples 1 to 3, wherein the controller is configured to receive data indicative of current engine torque and current engine speed, and further configured to determine the current engine efficiency parameter based on the current engine torque and current engine speed.

Example 5. Powertrain system according to any one of examples 1 to 4, wherein the controller is further configured to predict, based on the current engine efficiency parameter and data indicative of the pressure levels of each one of the gaseous fuel tanks, the first potential change in the engine efficiency for the first powertrain operational mode; predict, based on the current engine efficiency parameter, data indicative of the pressure levels of each one of the gaseous fuel tanks, and a needed power output from the internal combustion engine for operating the compressor assembly to provide the predetermined pressure fuel level, the second potential change in the engine efficiency for the second powertrain operational mode.

Example 6. Powertrain system according to any one of examples 1 to 5, wherein the compressor assembly is a reciprocating compressor having a compressor cylinder for accommodating a compressor piston.

Example 7. Powertrain system according to any one of examples 1 to 6, wherein the compressor assembly is arranged in a gaseous fuel conduit in-between the internal combustion engine and the gaseous fuel tank system.

Example 8. Powertrain system according to any one of examples 1 to 7, wherein the gaseous fuel is a hydrogen-based fuel or a natural gas fuel.

Example 9. Powertrain system according to any one of examples 1 to 8, wherein the compressor assembly is configured to at least partly be powered by the internal combustion engine.

Example 10. Powertrain system according to any one of examples 1 to 9, wherein the compressor assembly is configured to at least partly be powered by an auxiliary power source.

Example 11. A vehicle comprising a powertrain system according to any one of examples 1 to 10.

Example 12. A method for controlling a compressor assembly of a powertrain system 10 for a vehicle 1, the powertrain system comprising an engine 20 operable on a gaseous fuel 16, a gaseous fuel tank system 17 having a set of gaseous fuel tanks 17*a* to 17*n* for storing pressurized gaseous fuel, the gaseous fuel tank system being configured to be in fluid communication with the engine, and further a compressor assembly 8 for pressurizing gaseous fuel, the powertrain system being operable in a first powertrain operational mode, in which gaseous fuel is supplied from at least one of the gaseous fuel tanks of the set of gaseous fuel tanks to the engine in a non-operational mode of the compressor assembly, and in a second powertrain operational mode, in which gaseous fuel from at least one of the gaseous fuel tanks is pressurized by the compressor assembly in an operational mode of the compressor assembly, and supplied to the engine, the method being implemented by a controller having a processing circuitry, wherein the method comprises: receiving S10 data indicative of a current engine efficiency parameter; receiving S20 data indicative of pressure levels in one or more gaseous fuel tanks of the set of gaseous fuel tanks; predicting S30, based on the current engine efficiency parameter and at least one of the pressure levels, a first potential change in the engine efficiency for the first powertrain operational mode; predicting S40, based on the current engine efficiency parameter, at least one of the pressure levels, and a needed power output from the internal combustion engine for operating the compressor assembly to provide a predetermined pressure fuel level, a second potential change in the engine efficiency for the second powertrain operational mode; comparing S50 the predicted first potential change in the engine efficiency with the predicted second potential change in the engine efficiency; and controlling S60 the compressor assembly based on the comparison.

Example 13. A computer program product comprising program code for performing, when executed by the processing circuitry of any of examples 1-10, the method of example 12.

Example 14. A non-transitory computer-readable storage medium comprising instructions, which when executed by the processing circuitry of any of examples 1-10, cause the processing circuitry to perform the method of example 12.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A powertrain system for a vehicle, the powertrain system comprising an engine operable on a gaseous fuel, a gaseous fuel tank system having a set of gaseous fuel tanks for storing pressurized gaseous fuel, the gaseous fuel tank system being configured to be in fluid communication with the engine, and further a compressor assembly for pressurizing gaseous fuel, the powertrain system further being operable in a first powertrain operational mode, in which gaseous fuel is supplied from at least one of the gaseous fuel tanks of the set of gaseous fuel tanks to the engine in a non-operational mode of the compressor assembly, and in a second powertrain operational mode, in which gaseous fuel from at least one of the gaseous fuel tanks is pressurized by the compressor assembly in an operational mode of the compressor assembly and supplied to the engine, wherein the powertrain system further comprises a controller configured to:

predict, based on a current engine efficiency parameter and data indicative of at least one pressure level of at least one gaseous fuel tank of the set of gaseous fuel tanks, a first potential change in the engine efficiency for the first powertrain operational mode;

predict, based on the current engine efficiency parameter, the data indicative of at least one pressure level of at least one gaseous fuel tank of the set of gaseous fuel tanks, and a needed power output from the engine for operating the compressor assembly to provide a predetermined pressure fuel level, a second potential change in the engine efficiency for the second powertrain operational mode;

compare the predicted first potential change in the engine efficiency with the predicted second potential change in the engine efficiency; and control the compressor assembly either in the operational mode or the non-operational mode based on the comparison.

2. Powertrain system according to claim 1, wherein, if the predicted second potential change in the engine efficiency is higher than the predicted first potential change in the engine efficiency, the controller is configured to control the compressor assembly in the operational mode, such that the compressor assembly can pressurize gaseous fuel to the predetermined pressure fuel level.

3. Powertrain system according to claim 1, wherein, if the predicted first potential change in the engine efficiency is equal to, or higher than, the predicted second potential change in the engine efficiency, the controller is configured to control the compressor assembly in the non-operational mode, allowing gaseous fuel from at least one of the gaseous fuel tanks of the set of gaseous fuel tanks to be supplied to the engine.

4. Powertrain system according to claim 1, wherein the controller is configured to receive data indicative of the current engine efficiency parameter, and/or wherein the controller is configured to receive data indicative of current engine torque and current engine speed, and further configured to determine the current engine efficiency parameter based on the current engine torque and current engine speed.

5. Powertrain system according to claim 1, wherein the controller is configured to receive data indicative of pressure levels in one or more gaseous fuel tanks of the set of gaseous fuel tanks.

6. Powertrain system according to claim 5, wherein the controller is further configured to predict, based on the current engine efficiency parameter and data indicative of pressure levels of each one of the gaseous fuel tanks, the first potential change in the engine efficiency for the first powertrain operational mode; predict, based on the current engine efficiency parameter, the pressure levels of each one of the gaseous fuel tanks, and a needed power output from the engine for operating the compressor assembly to provide the predetermined pressure fuel level, the second potential change in the engine efficiency for the second powertrain operational mode.

7. Powertrain system according to claim 1, wherein the compressor assembly is a reciprocating compressor having a compressor cylinder for accommodating a compressor piston.

8. Powertrain system according to claim 1, wherein the compressor assembly is arranged in a gaseous fuel conduit in-between the engine and the gaseous fuel tank system.

9. Powertrain system according to claim 8, wherein the compressor assembly is arranged in-between the engine and a first fuel tank of the gaseous fuel tank system.

10. Powertrain system according to claim 1, wherein the gaseous fuel is a hydrogen-based fuel or a natural gas fuel.

11. Powertrain system according to claim 1, wherein the compressor assembly is configured to at least partly be powered by the internal combustion engine, and/or wherein the compressor assembly is configured to at least partly be powered by an auxiliary power source.

12. A vehicle comprising a powertrain system according to claim 1.

13. A method for controlling a compressor assembly of a powertrain system for a vehicle, the powertrain system comprising an engine operable on a gaseous fuel, a gaseous fuel tank system having a set of gaseous fuel tanks for storing pressurized gaseous fuel, the gaseous fuel tank system being configured to be in fluid communication with the engine, and further the compressor assembly for pressurizing gaseous fuel, the powertrain system being operable in a first powertrain operational mode, in which gaseous fuel is supplied from at least one of the gaseous fuel tanks of the set of gaseous fuel tanks to the engine in a non-operational mode of the compressor assembly, and in a second powertrain operational mode, in which gaseous fuel from at least one of the gaseous fuel tanks is pressurized by the compressor assembly in an operational mode of the compressor assembly, and supplied to the engine, the method being implemented by a controller having a processing circuitry, wherein the method comprises:

predicting, based on a current engine efficiency parameter and data indicative of at least one pressure level of at least one gaseous fuel tank of the set of gaseous fuel tanks, a first potential change in the engine efficiency for the first powertrain operational mode;

predicting, based on the current engine efficiency parameter, data indicative of at least one pressure level of at least one gaseous fuel tank of the set of gaseous fuel tanks, and a needed power output from the engine for operating the compressor assembly to provide a predetermined pressure fuel level, a second potential change in the engine efficiency for the second powertrain operational mode;

comparing the predicted first potential change in the engine efficiency with the predicted second potential change in the engine efficiency; and controlling the compressor assembly based on the comparison.

14. A computer program product comprising program code for performing, when executed by processing circuitry, the method of claim 13.

15. A non-transitory computer-readable storage medium comprising instructions, which when executed by processing circuitry, cause the processing circuitry to perform the method of claim 13.

* * * * *